UNITED STATES PATENT OFFICE.

WILLIAM BROWN KERR, OF MEDFORD, MASSACHUSETTS.

PROCESS OF MAKING MALTED COCOA OR CHOCOLATE.

No. 800,448. Specification of Letters Patent. Patented Sept. 26, 1905.

Application filed November 23, 1904. Serial No. 234,084.

*To all whom it may concern:*

Be it known that I, WILLIAM BROWN KERR, a citizen of the United States, and a resident of Medford, in the county of Middlesex and State of Massachusetts, have invented new and useful Improvements in Processes of Making Malted Cocoa or Chocolate, of which the following is a full, clear, and exact description.

My invention consists of a process of making malted cocoa or chocolate.

Among the several objects of my improvements are the following: first, to render the cocoa or chocolate more easily digestible; second, to render the same more palatable, and, third, to make a combinational article of food suitable for many culinary purposes for which neither of the ingredients could be used separately.

To one hundred pounds of cocoa or chocolate reduced to the form of a powder I add ten pounds of dry coarse malt and twenty-five pounds of water, boiling the admixture for a few minutes, then cooling the same to 110° Fahrenheit, and then adding a small quantity, preferably one-half to one ounce of commercial papain, stirring the admixture for twenty minutes, then boiling the entire admixture for a period of about one-half an hour. The papain, being a proteolytic and diastatic ferment acts upon the cocoa or chocolate so as to predigest the same, the action being most marked with reference to the starch and to the fatty or greasy portions of the cocoa or chocolate. It is these portions which are ordinarily indigestible. The boiling being completed, the admixture is strained and is then concentrated by drying to the form of a powder, which is then packed into boxes or other receptacles and is ready for use.

Having thus described my invention, I claim as new and desire to secure by Letters Patent—

1. The process herein described of preparing malted cocoa or chocolate, which consists in grinding together an admixture of coarse chocolate or cocoa and coarse malt, adding water thereto, boiling the admixture, cooling to 110° Fahrenheit, adding commercial papain, stirring for twenty minutes at 110° Fahrenheit, and then boiling for a period of about one-half of an hour.

2. The process herein described of manufacturing malted cocoa or chocolate, which consists in admixing cocoa or chocolate with coarse malt and water, boiling the admixture, cooling the same to a point below the boiling-point, predigesting the cocoa or chocolate at said temperature below the boiling-point, again boiling, and finally removing the water so as to leave the residuum in the form of a powder.

3. The process herein described of manufacturing malted cocoa or chocolate, which consists in boiling together the cocoa or chocolate and malt, cooling the admixture, adding to said admixture a suitable ferment capable of acting thereupon, then boiling the admixture containing said ferment, and finally reducing said admixture to a commercial form.

In testimony whereof I have signed my name to this specification in the presence of two subscribing witnesses.

WILLIAM BROWN KERR.

Witnesses:
LEWIS J. PIERCE,
ANDREW KERR.